(12) United States Patent
Sorensen

(10) Patent No.: US 8,302,738 B2
(45) Date of Patent: Nov. 6, 2012

(54) POWER TRAIN HANDLER

(76) Inventor: Roger Chris Sorensen, Brigham City, UT (US)

( * ) Notice: Subject to any disclaimer, the term of this patent is extended or adjusted under 35 U.S.C. 154(b) by 2065 days.

(21) Appl. No.: 10/454,255

(22) Filed: Jun. 3, 2003

(65) Prior Publication Data

US 2004/0256819 A1    Dec. 23, 2004

(51) Int. Cl.
B66F 7/00 (2006.01)
B66F 1/06 (2006.01)
B66B 9/16 (2006.01)
B25B 1/22 (2006.01)

(52) U.S. Cl. ......... 187/203; 187/243; 187/244; 254/2 C; 254/7 C; 254/133 R; 254/134; 269/71

(58) Field of Classification Search ................ 187/203, 187/213, 215, 218–21, 240–244; 254/133 A, 254/134, 2 B, 2 C, 7 B, 7 C, 8 B, 8 C; 269/71, 269/265, 271, 289 MR
See application file for complete search history.

(56) References Cited

U.S. PATENT DOCUMENTS

| | | | | |
|---|---|---|---|---|
| 1,518,490 A * | 12/1924 | Dixon | ........................... | 254/102 |
| 1,600,835 A * | 9/1926 | Manley | ........................... | 269/46 |
| 2,637,522 A * | 5/1953 | Wallace | ........................ | 187/219 |
| 3,155,193 A * | 11/1964 | Racely | ............................ | 187/220 |
| 3,306,601 A * | 2/1967 | Mitchell | ......................... | 269/50 |
| 3,757,898 A * | 9/1973 | Mitchell et al. | ............... | 187/205 |
| 4,123,038 A * | 10/1978 | Meyers | ......................... | 254/2 R |
| 4,375,934 A * | 3/1983 | Elliott | ............................ | 414/11 |
| 4,804,162 A * | 2/1989 | Rice | ............................ | 248/671 |
| 5,100,283 A * | 3/1992 | Carty | ............................ | 414/590 |
| 5,297,908 A * | 3/1994 | Knott | ............................ | 410/26 |
| 5,338,015 A * | 8/1994 | Liegel et al. | ..................... | 269/71 |
| 5,397,207 A * | 3/1995 | Arellano et al. | ................ | 414/11 |
| 6,260,218 B1 * | 7/2001 | Tsuga | ............................. | 5/86.1 |
| 6,533,260 B1 * | 3/2003 | Mock | ............................. | 269/17 |
| 6,581,920 B1 * | 6/2003 | Smith et al. | ..................... | 269/17 |
| 6,773,218 B1 * | 8/2004 | Mingoes | ......................... | 414/10 |

\* cited by examiner

*Primary Examiner* — Michael Mansen
*Assistant Examiner* — Stefan Kruer
(74) *Attorney, Agent, or Firm* — Fehr Law Firm; Thompsson E. Fehr

(57) ABSTRACT

A power train handler having a first inverted T-shaped stand and a second inverted T-shaped stand the height of each of which is preferably independently adjustable. A T-shaped support is slidably attached to the upper end of each inverted T-shaped stand. Either an inverted U-shaped tip plate is rotationally balanced on a T-shaped support or a slotted bar having rotationally mounted arms is attached to the T-shaped support. Preferably, wheels are attached to the bottom of the inverted T-shaped stands; and, preferably, the inverted T-shaped stands are releasably, slidably, and lockably connected to each other.

2 Claims, 4 Drawing Sheets

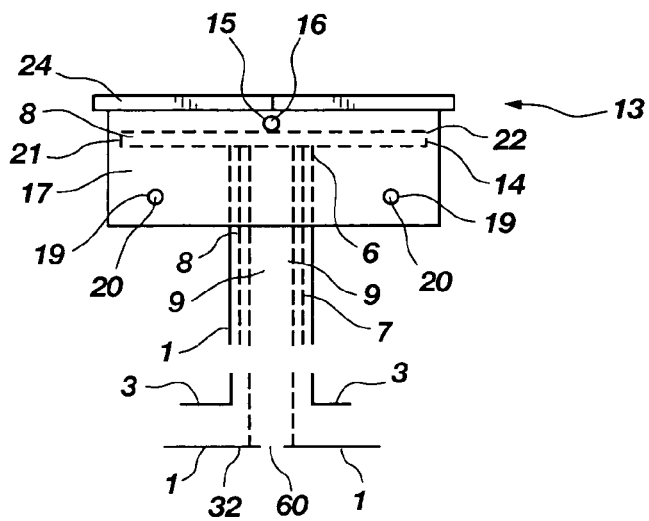
FIG. 2
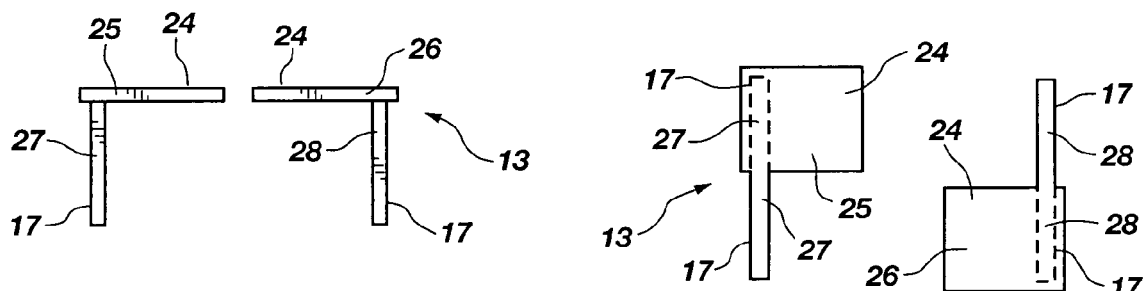
FIG. 4
FIG. 5
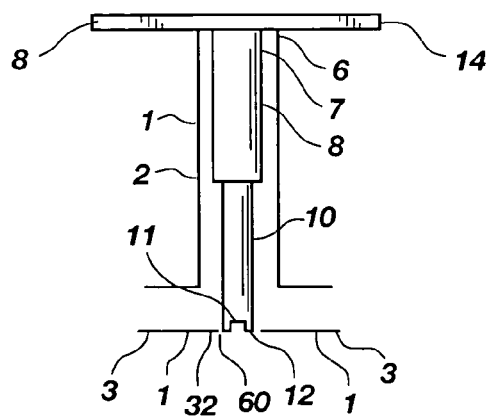
FIG. 3

POWER TRAIN HANDLER

BACKGROUND OF THE INVENTION

1. Field of the Invention

This invention relates to a device for facilitating the removal and installation of a power train for a motor vehicle as well as transporting and providing a platform for working on such power train when it has been removed from the vehicle.

2. Description of the Related Art

Two handlers for power trains are known to the present inventor.

SPX/OTC Service Solutions of Owatonna, Minn., manufactures a no. 1585 power train lift in addition to a 6710A engine cradle and a 6135 power train dolly. The latter two items utilize these numbers in the Chrysler catalog and are to be used in conjunction with one another.

However, neither of these handlers two support stands the height of each of which is independently adjustable, which leave the bottom of the power train accessible, the distance between which stands can be varied, a self-leveling top, the ability to be compactly stored, and chains for securing the power train to the handler.

BRIEF SUMMARY OF THE INVENTION

The Power Train Handler of the present invention has two support stands releasably connected by a connecting bar, allowing the distance between the support stands to be varied and making the bottom of a power train held by the support stands available so that the pan can be removed.

Work can be performed on the power train while it on the Power Train Handler of the present invention. Furthermore, wheels below the support stands permit the Power Train Handler and any power train it is supporting to be moved to other locations, as desired.

The height of each support stand and the components associated therewith is independently adjustable in order to accommodate power trains having different dimensions. And, preferably, the top of each support stand has a self-leveling tip plate.

The Power Train Handler can also be partially disassembled and then reassembled in a compact fashion for storage.

In lieu of the tip plate, a slotted bar with attached rotating arms can optionally be placed on top of one or more of the support stands further to accommodate varying types of power trains or to permit one end of a motor vehicle to be raised so that the Power Train Handler can be used to move such vehicle.

Preferably, the Power Train Handler also includes chains for even more secure retention of a power train and a plate to support a jack.

BRIEF DESCRIPTION OF THE SEVERAL VIEWS OF THE DRAWING

FIG. 2 shows the interior of a support stand and other components attached to the support stand.

FIG. 3 is a cutaway view illustrating a preferred mechanism for elevating the T-shaped support that is placed at the upper end of each support stand.

FIG. 4 is a lateral view of a tip plate.

FIG. 5 is a plan view of a tip plate.

DETAILED DESCRIPTION OF THE INVENTION

The Power Train Handler of the present invention supports the power train of a motor vehicle with or without the engine being connected to the remainder of the power train.

Work can be performed on the power train while it is situated on the Handler, and the power train can be moved from place to place.

Figure 1:
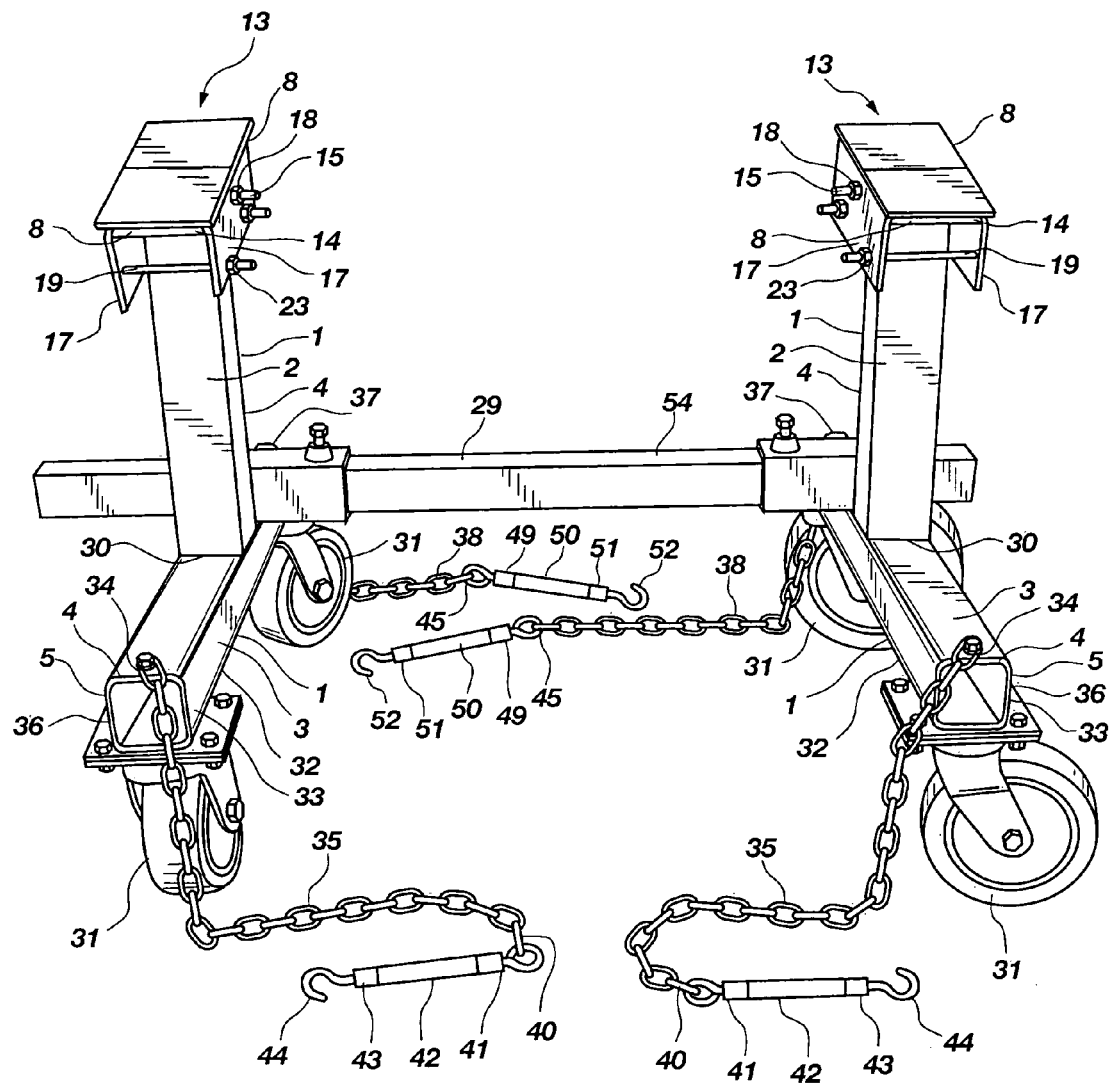
FIG. 1 provides an overall lateral view of the Power Train Handler.

The basic structures of the Power Train Handler are two inverted T-shaped stands 1, as illustrated in FIG. 1.

At least the vertical portion 2 of each stand 1 is, as most clearly viewed in FIG. 2, hollow; and, preferably, both the horizontal portion 3 and the vertical portion 2 of each stand 1 are constructed of a steel channel 4 having a square cross-sectional shape 5.

Slidably attached to an upper end 6 of the vertical portion 2 of each stand 1 is a vertical portion 7 of a T-shaped support 8. Preferably, the upper end 6 of the vertical portion 2 of each stand 1 is open; and into such open upper end 6 is slidably inserted the vertical portion 7 of a T-shaped support 8. An elevating mechanism 9 is preferably attached to the support 8 and also to the stand 1 in order to raise and lower the support 8 with respect to the stand 1. The elevation of each support 8 can, consequently, be independently adjusted.

Preferably, the elevating mechanism 9 comprises, as depicted in FIG. 3, a screw 10 having an adapter 11 for an air ratchet on the bottom 12 of such screw. (Of course, an aperture 60 must exist in the bottom 32 of the stand 1 in order to provide access to the adapter 11.)

An inverted U-shaped tip plate 13 is preferably rotationally balanced on the horizontal portion 14 of the T-shaped support 8. This is preferably accomplished by having a bolt 15 pass through apertures 16 in the sides 17 of the U-shaped tip plate 13. The bolt 15 is placed on the horizontal portion 14 of the T-shaped support 8. Preferably, the bolt 15 is releasably secured with a nut 18.

In order to prevent inadvertent removal of the U-shaped tip plate 13, the U-shaped tip plate 13 is preferably loosely secured to the horizontal portion 14 of the T-shaped support 8; to do this, preferably two additional bolts 19 are placed in two additional pairs of apertures 20 in the sides 17 of the U-shaped tip plate 13. With respect to the apertures 16, both pairs of apertures 20 are lower so that the bolt 15 is above the horizontal portion 14 of the T-shaped support 8 while the two additional bolts 19 are placed below the horizontal portion 14 of the T-shaped support 8. Also, one of the pairs of additional apertures 20 is placed nearer a first end 21 of the U-shaped tip plate 13 than are the apertures 16; and the other pair of additional apertures 20 is located nearer a second end 22 of the U-shaped tip plate 13 than are the apertures 16. Also preferably, each of the two additional bolts 19 is secured with a nut 23.

The tip plate 13, therefore, both self levels and slides on the horizontal portion 14 of the T-shaped support 8.

Additionally, in order to facilitate aligning the bolts 15, 19 with the apertures 16, 20, the horizontal portion 24 of the U-shaped tip plate 13 is preferably, as shown in FIG. 4 and FIG. 5, transversely separated into a first horizontal surface 25 and a second horizontal surface 26, with the first horizontal surface 25 attached to a first side 27 of the U-shaped tip plate 13 and with the second horizontal surface 26 attached to a second side 28 of the U-shaped tip plate 13.

Preferably, as seen in FIG. 1, a connecting bar 29 is attached to each of the two inverted T-shaped stands 1; and, even more preferably, such connection is releasable. Also, preferably such connection is—using any technique that is well known in the art, such as a thumb screw in a threaded aperture—slidable and lockable, permitting the distance between the two inverted T-shaped stands 1 to be varied. Preferably, the connecting bar 29 is attached low, i.e., near the horizontal portion 3, on the vertical portion 2 of each stand 1 or on the horizontal portion 3 of each stand 1, in order to provide more room for the power train, and, even more preferably, is attached at or near the intersection 30 of the vertical portion 2 and the horizontal portion 3 of each stand 1.

Figure 6:
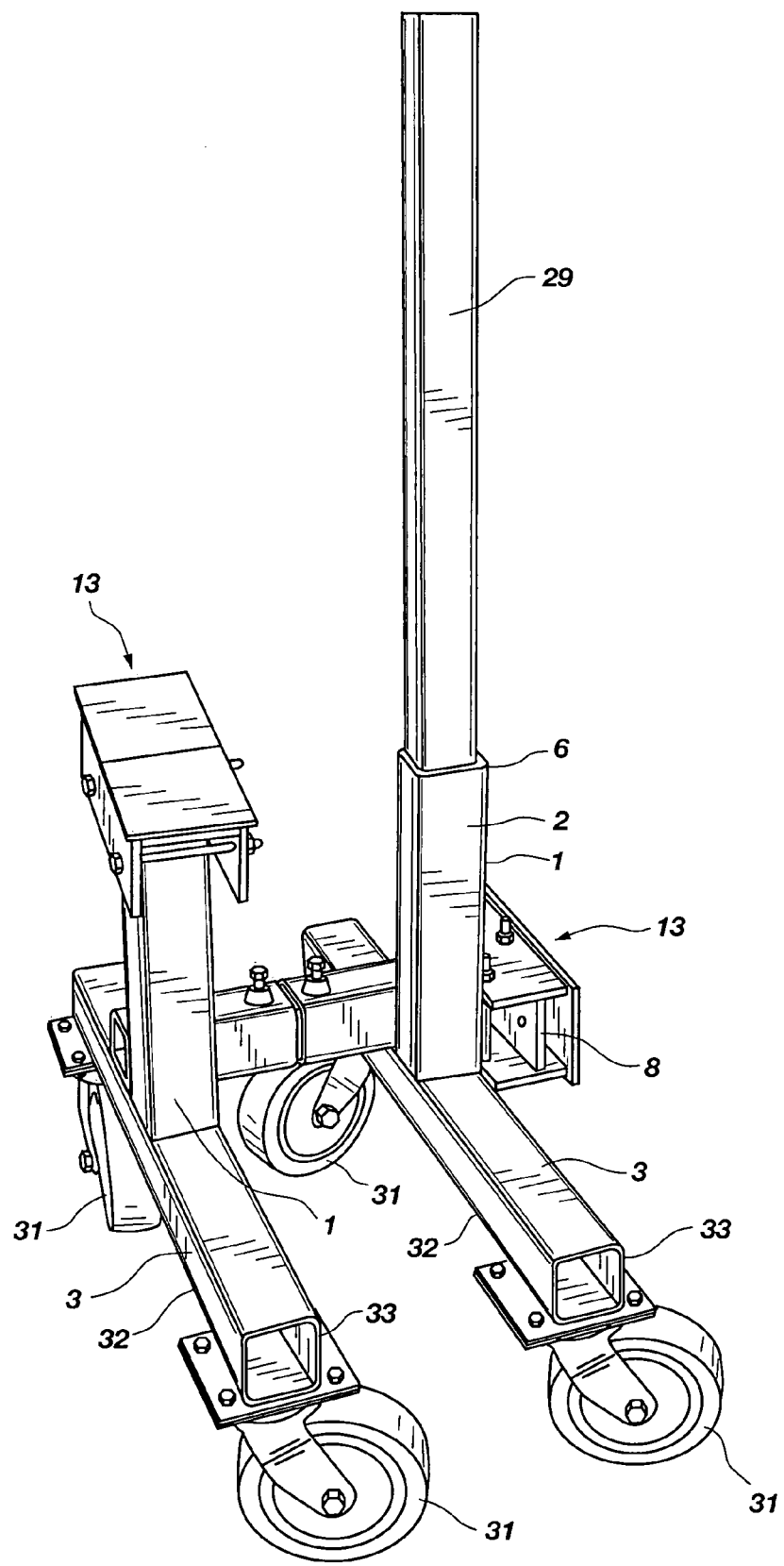
FIG. 6 portrays the storage configuration of the Power Train Handler.

Preferably, the connecting bar 29 and the vertical portion 7 of each T-shaped support 8 have substantially the same cross-sectional shape and dimensions so that the connecting bar 29 can, as illustrated in FIG. 6, be placed in the vertical portion 2 of a stand 1 and a T-shaped support 8 can be releasably and slidably attached to the two inverted T-shaped stands 1, bringing such inverted T-shaped stands 1 near one another for compact storage of the Power Train Handler.

Preferably, wheels 31, which are preferably caster wheels 31, are mounted to the bottom 32 of the horizontal portion 3 each inverted T-shaped stand 1. Preferably, such wheels 31 are also near the ends 33 of the horizontal portion 3 each inverted T-shaped stand 1.

And, preferably, a first end 34 of a chain 35 is attached to the left side 36 of the horizontal portion 3 of each inverted T-shaped stand 1; and a first end 37 of a second chain 38 is attached to the right side 39 of the horizontal portion 3 each inverted T-shaped stand 1. To the second end 40 of the chain 35 is attached a first end 41 of a turnbuckle 42, and to the second end 43 of the turnbuckle 42 is attached a hook 44 for releasable engagement with the power train. Similarly, to the second end 45 of the second chain 48 is attached a first end 49 of a turnbuckle 50, and to the second end 51 of the turnbuckle 50 is attached a hook 52 for releasable engagement with the power train.

Also, preferably, a plate 53 upon which a jack can sit is attached to the top 54 of the connecting bar 29.

Figure 7:
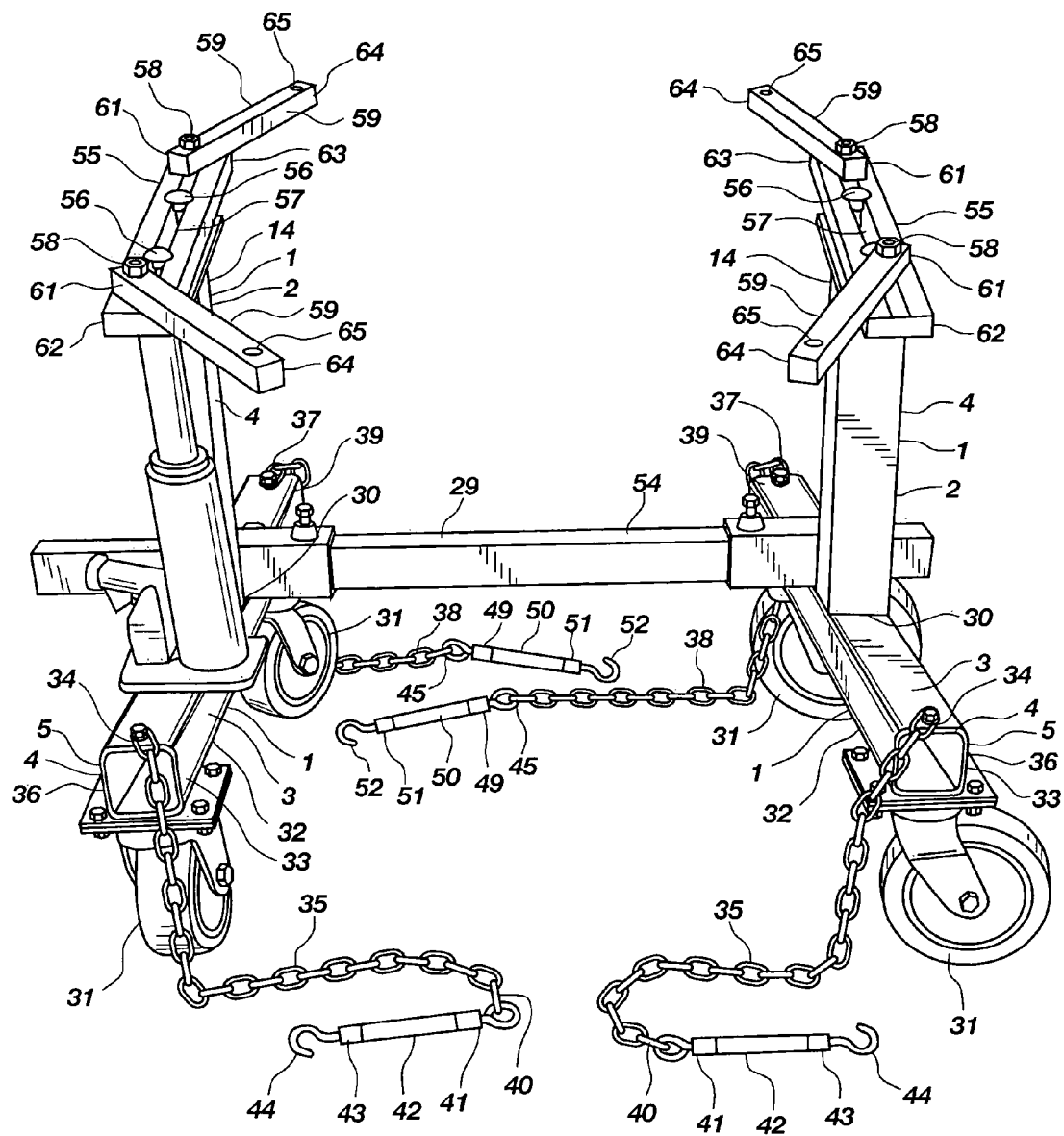
FIG. 7 is an overall lateral view of an optional version of the Power Train Handler, having a plate for a jack attached to the horizontal portion a support stand as an alternate method for elevating the T-shaped support at the upper end of a support stand and having a slotted bar with rotatably attached arms, in lieu of the tip plate, on top of the horizontal portion of the T-shaped supports at the upper end of the support stands.

Optionally, in lieu of a U-shaped tip plate 13, a slotted bar 55 is, as portrayed in FIG. 7, attached, preferably with bolts 56 extending through the slot 57, to the horizontal portion 14 of at least one of the T-shaped supports 8. Rotatably attached, preferably with bolts 58 extending through the slot 57, are two arms 59. The attachment is preferably near a first end 61 of each arm 59. Preferably, one arm 59 is near a first end 62 of the bar 55; and a second arm 59 is near a second end 63 of the bar 55. Near a second end 64 of each arm is an aperture 65 for a support (not illustrated) to engage the power train.

Having the slotted bar 55 and arms 59 on one T-shaped support 8 enables the Power Train Handler to hold Asian-made powertrains. Having the slotted bar 55 and arms 59 on both T-shaped supports 8 enables the Powertrain Handler to hold a late model Chrysler powertrain.

I claim:
1. A power train handler, which comprises:
a first inverted T-shaped stand having a vertical portion with an upper end and a horizontal portion;
a first T-shaped support having a vertical portion and a horizontal portion with the vertical portion of said T-shaped support being slidably attached to the upper end of the vertical portion of said first inverted T-shaped stand;
a first inverted U-shaped tip plate rotationally balanced on the horizontal portion of said first T-shaped support;
a second inverted T-shaped stand having a vertical portion with an upper end and a horizontal portion;
a second T-shaped support having a vertical portion and a horizontal portion with the vertical portion of said T-shaped support being slidably attached to the upper end of the vertical portion of said second inverted T-shaped stand; and
a second inverted U-shaped tip plate rotationally balanced on the horizontal portion of said second T-shaped support;
the handler further comprising:
a means for elevating said first T-shaped support attached to said first T-shaped support and to said first inverted T-shaped stand;
a means for elevating said second T-shaped support attached to said second T-shaped support and to said second inverted T-shaped stand; and
a means for releasably, slidably, and lockably connecting said first inverted T-shaped stand to said second inverted T-shaped stand;
wherein:
the upper end of the vertical portion of said first inverted T-shaped stand is open with the vertical portion of said first T-shaped support slidably inserted into the vertical portion of said first inverted T-shaped stand;
the upper end of the vertical portion of said second inverted T-shaped stand is open with the vertical portion of said second T-shaped support slidably inserted into the vertical portion of said second inverted T-shaped stand;
the means for elevating said first T-shaped support comprises a screw having an adapter for an air ratchet on a bottom of such screw with an aperture for reaching the adapter being located at a bottom of said first inverted T-shaped stand;
the means for elevating said second T-shaped support comprises a screw having an adapter for an air ratchet on a bottom of such screw with an aperture for reaching the adapter being located at a bottom of said second inverted T-shaped stand;
the means for releasably, slidably, and lockably connecting said first inverted T-shaped stand to said second inverted T-shaped stand is a connecting bar releasably, slidably, and lockably attached to said-first inverted T-shaped stand and to said second inverted T-shaped stand;
said first inverted U-shaped tip plate is loosely secured to the horizontal portion of said first T-shaped support;
said second inverted U-shaped tip plate is loosely secured to the horizontal portion of said second T-shaped support; and further comprising:
wheels mounted to a bottom of the horizontal portion of said first inverted T-shaped stand and to a bottom of the horizontal portion of said second inverted T-shaped stand.

2. The power train handler as recited in claim 1, wherein:
said connecting bar is constructed with dimensions such that said connecting bar can be inserted into the open upper end of the vertical portion of said first inverted T-shaped stand in lieu of the vertical portion of said first T-shaped support; and the vertical portion of said first T-shaped support is constructed with dimensions so that the vertical portion of said first T-shaped support can be releasably, slidably, and lockably attached to said first inverted T-shaped stand and to said second inverted T-shaped stand in lieu of said connecting bar.

* * * * *